UNITED STATES PATENT OFFICE.

ALFRED CONZETTI, OF BASEL, SWITZERLAND, ASSIGNOR TO ANILINE COLOUR AND EXTRACT WORKS, FORMERLY JOHN R. GEIGY, OF BASEL, SWITZERLAND.

TRIPHENYLMETHANE DYE AND PROCESS OF MAKING SAME.

No. 877,054.  Specification of Letters Patent.  Patented Jan. 21, 1908.

Application filed August 1, 1907. Serial No. 386,625.

*To all whom it may concern:*

Be it known that I, ALFRED CONZETTI, doctor of philosophy, chemist, a citizen of the Swiss Republic, and residing at Basel, Switzerland, have invented certain new and useful Improvements in Mordant-Dyeing Coloring-Matters of the Triphenylmethane Series, of which the following is a specification.

*Triphenylmethane Dye and Process of Making Same.*

My present invention relates to the production of new triphenylmethane dye-stuffs, adapted to be afterwards treated with bichromate by condensing diortho-dichloro-benzaldehyde of the general formula:

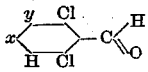

($x$ and $y$ representing hydrogen atoms which can be replaced by halogen the nitro or sulfo-group) for instance: diortho-dichloro-benzaldehyde (CHO:Cl:Cl = 1:2:6) trichlorobenzaldehyde (CHO:Cl:Cl:Cl = 1:2:6:4 and 1:2:6:5)

nitro-dichloro-benzaldehyde (CHO:Cl:Cl:NO = 1:2:6:5)

sulfo-dichloro-benzaldehyde (CHO:Cl:Cl:SO$_2$H = 1:2:6:5)

and the like with aromatic oxycarbonic acids such as ortho-cresotinic acid or salicylic acid and by oxidizing the thus produced leuco compounds in presence of concentrated sulfuric acid by means of nitrous acid or nitric acid.

The following examples will serve to illustrate the manner in which the new coloring matters can be obtained in practice, but my invention is not limited to these examples.

Example I. 17.5 kilos of 2-6-dichloro-benzaldehyde obtained from 2-6-dichloro-toluene after known processes, and 30.4 kilos of orthocresotinic acid are stirred with 150 kilos of concentrated sulfuric acid for 2 hours at ordinary temperature with the result of condensation into a leucobody which then is permitted to oxidize at 60-70° C. by the slow influx of a solution of 7 kilos of nitrite of sodium in 50 kilos of concentrated sulfuric acid. As soon as the development of brown gases shall cease, the oxidation is finished; the mass is poured into 1000 liters of water, filtered off, washed and dried. The dyestuff, a powder of a fiery red, is insoluble in water, soluble in soda-solution with a brownish, in alkali with a blue tint and is precipitated by an excess of alkali in form of blue flakes. The dyestuff dyes wool in an acidulated bath a bluish red which by aftertreatment with bichromate of potassium will turn a pure blue shade fast to milling and light. If in this example the 2-6-dichlorobenzaldehyde is substituted by 2-4-6 trichloro-3-oxybenzaldehyde a dyestuff is obtained with similar properties the alkaline solution of which is a reddish violet and the dyeings of which when afterchromed, show a blue still more brilliant. The same pure blue shades are produced by dyeing chrome mordanted wool with these dyestuffs and they can also be used for printing on cotton when mixed with a chrome salt.

Example II. 8, 8 kilos of 2-6-dichloro-benzaldehyde dissolved in a mixture of 20 kilos of monohydrate of sulfuric acid and 40 kilos of fuming sulfuric acid containing 60 per cent SO$_3$ are heated for an hour to 90-100° C. After cooling down 11 kilos ice and 3. kilos concentrated sulfuric acid are added. To this mixture consisting now of a solution of 2-6-dichloro-benzaldehyde-5-sulfonic acid in sulfuric acid of 92 per cent are further added 15.2 kilos of cresotinic acid and the whole is stirred for an hour and a half while being cold. Then the solution of 3.5 kilos of sodium nitrite in 50 kilos concentrated sulfuric acid is made to run in and all is heated up to 80° C. The oxidation of the leucocompound commences already at 35° C. and is accomplished after an hour and a half by raising the temperature up to 100° C. The melt is poured into ice water and the dissolved dyestuff precipitated from the solution by addition of common salt. When dried it presents a reddish brown powder of slight bronze luster easily soluble in water with an orange red color, turning to a brown red by addition of soda and to a violet blue with caustic soda lye.

Having now described my invention what I claim is—

1. The process for the production of coloring matters of the triphenylmethane series by condensing the hereinbefore defined diortho-dichloro-benzaldehydes in presence of concentrated sulfuric acid with aromatic orthooxy-carbonic acids and by subsequently oxidizing the thus produced leucocompounds by means of a solution of sodium nitrite in concentrated sulfuric acid.

2. The process for the production of coloring matters of the triphenylmethane series by condensing the hereinbefore defined diortho-dichloro-benzaldehydes in presence of concentrated sulfuric acid with orthocresotinic acid and by subsequently oxidizing the thus produced leucocompounds by means of nitrosylsulfuric acid.

3. The process for the production of coloring matters of the triephnylmethane series by condensing the hereinbefore defined diortho-dichloro-benzaldehydes in presence of concentrated sulfuric acid with orthocresotinic acid and by subsequently oxidizing the thus produced leucocompounds by means of a mixture of nitric and sulfuric acid.

4. As new articles of manufacture the coloring matters obtainable as described from the hereinbefore defined diortho-dichloro-benzaldehydes and aromatic orthooxy carbonic acids which dyestuffs are in the shape of their free carbonic acids from fiery red to brownish red powder, soluble in diluted caustic soda lye with a blue color, dying wool from acid bath bright red shades which by aftertreatment with bichromate change into a pure blue, and yielding the same pure blue shades when printed on cotton with a chrome salt.

5. As new article of manufacture the coloring matter obtainable as described from the diortho-dichloro-benzaldehyde and orthocresotinic acid which dyestuff is in the shape of its free carbonic acid a fiery red powder, insoluble in water, soluble in diluted caustic soda lye with a blue color, dyeing wool from acid bath bright red shades which by aftertreatment with bichromate change into a pure blue, and yielding the same pure blue shades when printed on cotton with a chrome salt.

In testimony whereof I have signed this specification in the presence of two subscribing witnesses.

ALFRED CONZETTI.

Witnesses:
  GEO. GIFFORD,
  CHARLES KOECHLIN.